United States Patent [19]

Nagasawa et al.

[11] Patent Number: 4,799,271

[45] Date of Patent: Jan. 17, 1989

[54] OPTICAL CHARACTER READER APPARATUS

[75] Inventors: Hikoshi Nagasawa; Kazuo Ito; Shigeru Horii; Katsuhide Tanoshima, all of Tokyo, Japan

[73] Assignee: Oki Electric Industry Co., Ltd., Tokyo, Japan

[21] Appl. No.: 27,408

[22] Filed: Mar. 18, 1987

[30] Foreign Application Priority Data

Mar. 24, 1986 [JP] Japan .................................. 61-63973

[51] Int. Cl.4 ............................................... G06K 9/03
[52] U.S. Cl. .......................................... 382/40; 382/57
[58] Field of Search .................. 382/40, 30, 33, 34, 382/57

[56] References Cited

U.S. PATENT DOCUMENTS

| 3,925,761 | 12/1975 | Chaires et al. | 382/40 |
|---|---|---|---|
| 3,995,254 | 11/1976 | Rosenbaum | 382/40 |
| 4,010,445 | 3/1977 | Hoshino | 382/40 |
| 4,058,795 | 11/1977 | Balm | 382/40 |
| 4,328,561 | 5/1982 | Convis et al. | 382/40 |
| 4,468,809 | 8/1984 | Grabowski et al. | 382/34 |
| 4,484,348 | 11/1984 | Shizumo | 382/34 |
| 4,556,951 | 12/1985 | Dickman et al. | 382/40 |

*Primary Examiner*—Leo H. Bourdreau
*Attorney, Agent, or Firm*—Wenderoth, Lind & Ponack

[57] ABSTRACT

An optical character reader apparatus is provided to optically read characters written on a document card to extract as a word a character group compared with previously registered words. Such a word is compared for each character constituting that word. When the number of constituent characters constituting the extracted word is greater than a prescribed number, a judgement is made as to whether or not each constituent character is a vowel, and, if so, is removed and, if otherwise, subsequently compared with respect to characters other than vowels. As a result, a word which is found to have the largest number of coincident characters to previously registered words, is selected as a candidate word and delivered as the word read from the document card.

9 Claims, 7 Drawing Sheets

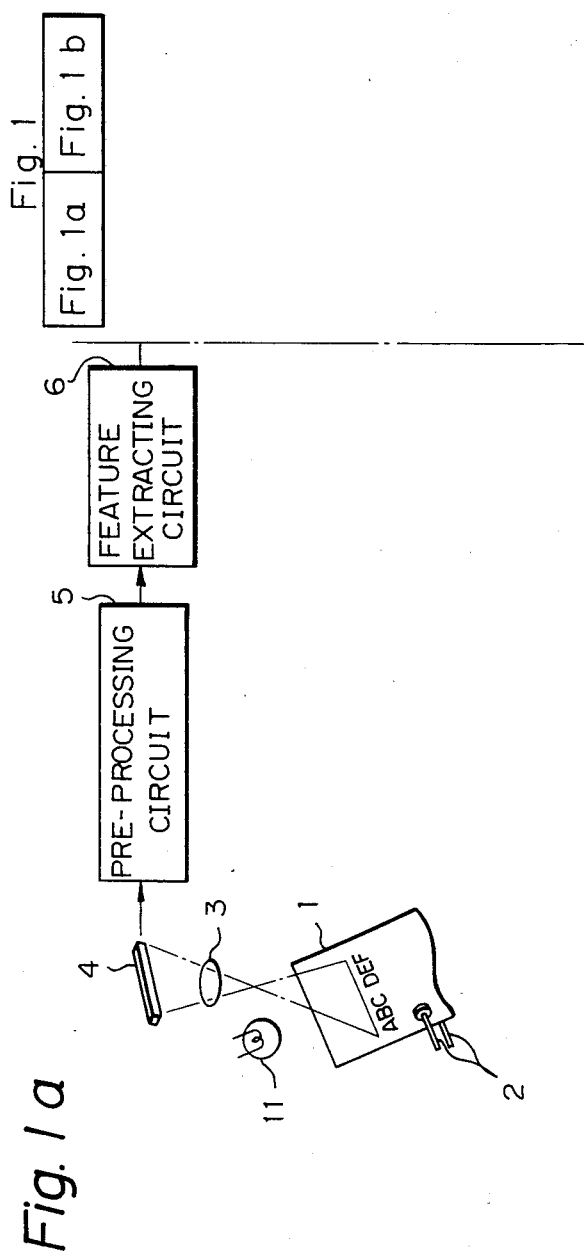

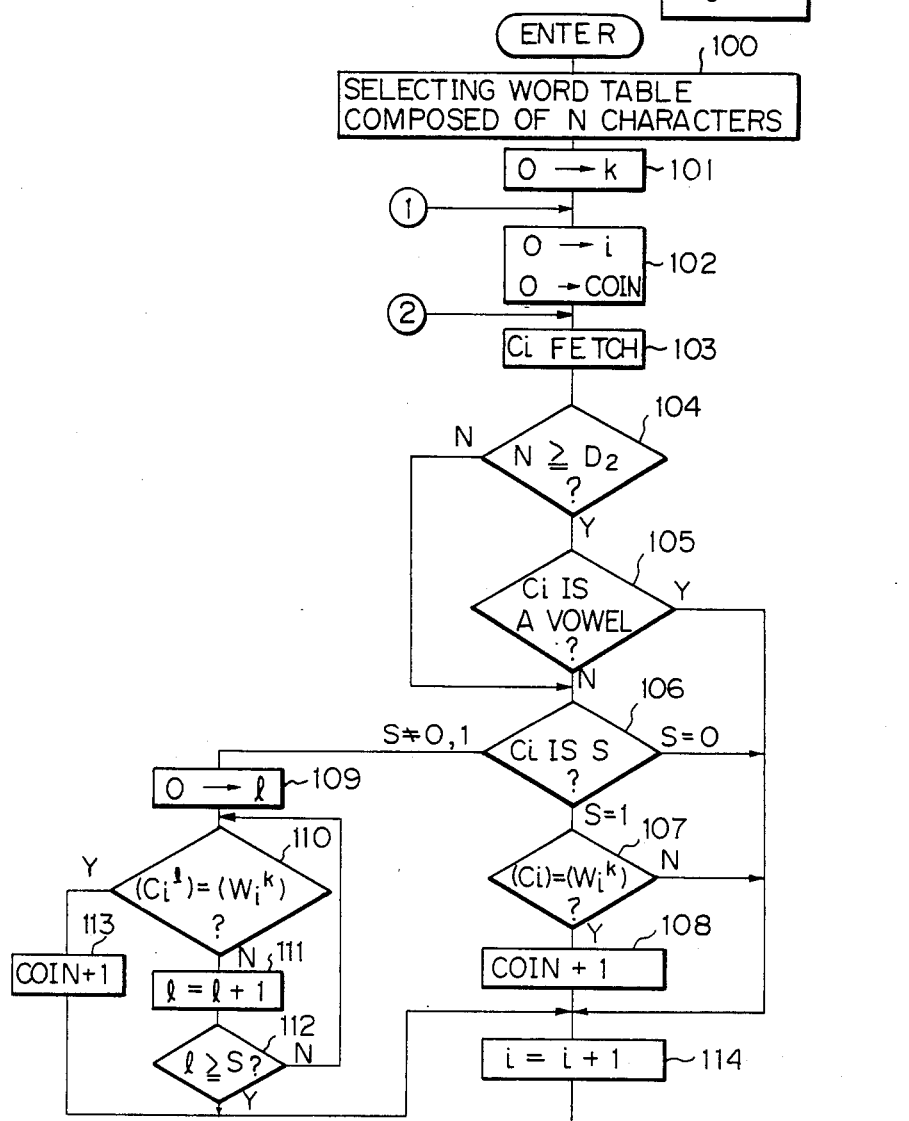

OPTICAL CHARACTER READER APPARATUS

BACKGROUND OF THE INVENTION

1. Field of the Invention

The present invention relates to an optical character reader (hereinafter referred to as OCR) apparatus adapted to yield a picture image signal by illuminating characters written on a document card with light from a light source to render reflected light therefrom to photoelectric conversion to provide an electrical signal, extracting the feature of respective characters by extracting the original characters from the picture image signal one at a time, and comparing the features of an extracted character with a previously stored character pattern in a dictionary memory. More particularly it relates to a word comparison system of an OCR adapted to extract a character group as a word, and to compare the extracted word with a previously stored word in the memory for recognizing characters on a document card.

2. Description of the Prior Art

A prior OCR is adapted, as disclosed in Japanese Patent Application No. 59-125033, to illuminate alphabetic characters written on a document card with a lamp, and focusing reflected light onto a photoelectric converter sensor through a lens to convert the picture image signal on the document card into an electrical signal as an output from the sensor.

In succession, a pre-processing circuit extracts a fractional picture image corresponding to one character from the resulting line image and transmits it to a feature extracting circuit. The feature extracting circuit executes the so-called recognition algorithm adapted to extract the features of a character line or a background in conformity with a predetermined procedure. In succession, a character judgement circuit compares the resulting features with those of characters previously stored in a dictionary memory and delivers coincident character codes to a post-processing circuit. Three cases are considered thereupon as the output from the character judgement circuit: a plurality of character codes are yielded; only one character code is yielded; and no character code is yielded. The post-processing circuit operates for the abovenoted situations as follows: it delivers the one character, when only one character has been yielded, interpreting the character as having been satisfactorily recognized; with no character code being yielded, as described above it delivers a non-recognizable code from its output terminal as an indication that the dictionary has failed to recognize the character as being existent; and furthermore, with a plurality of character codes being yielded, a situation which may frequently occur when the character pattern resembles other character patterns, and hence the character pattern can not be said to correspond to one character code but rather appears to correspond to a plurality of character candidates. There is a method of eliminating unnecessary candidates among those plurality of candidates for selecting only one character code therefrom, by making use of previously known information indicating a certain character is not written on the document card adjoining another certain character on the basis of the context thereof. For example, when "U" and "V" are yielded as those character candidates in an Engligh sentence with a character "Z" located in front of them, the "V" is regarded as being an improper character if located just behind the "Z", it is eliminated with a result of "U" being selected, and thus the "U" code is delivered from an output terminal. Thereupon, information concerning combinations of characters not adjoining to the character code before and behind it can be employed at need by storing such information in a table.

In addition, another known method judges whether or not the candidate character is proper by noting two or three adjacent characters to previously provide the frequency of occurrences of combinations of those characters (this known method is called a 2-gram, 3-gram, and generally n-gram method).

In still another known method, a word is extracted from a character group read by a character judgement circuit to compare it with a stored previously word for judgement at a word level. Namely, character codes of characters constructing read words are compared in succession with those stored constructed words, and the stored word having the largest numbers of coincident character codes is judged to be the read word.

SUMMARY OF THE INVENTION

In view of the drawbacks of the prior art, it is an object of the present invention to provide an optical character reader (OCR) apparatus capable of more securely judging, when a character on a document card can not be recognized and hence a plurality of character candidates are yielded, that a character on a document card is proper by uniquely selecting it from those candidates.

Another object of the present invention is to provide an optical character reader apparatus capable of character recognition even when character recognition can not be effected and hence no character candidate is presented.

Still another object of the present invention is to provide an optical character reader apparatus capable of reducing the comparison processing time by effecting it in a unit of a word in a character group and further effecting the same after removing vowels in characters constituting that word.

To achieve the above objects, an optical character reader apparatus (hereinafter, referred to as an OCR apparatus) according to the present invention is adapted to illuminate characters on a document card with light from a light source and to subject reflected light therefrom to photoelectric conversion for thereby providing an electrical signal to yield a picture image signal, extracting the feature of each of the characters by extracting the characters one at a time from the picture image signal, and comparing the feature so extracted with character patterns previously stored in a dictionary memory, for character recognition, and furthermore extracting a character group between two successive spaces as a word to compare the extracted word as with previously stored words, for recognition of words on a document card.

Moreover, the OCR apparatus according to the present invention includes a word table selecting part for selecting a proper word table in a word dictionary memory corresponding to the number of characters constituting the extracted word; a word-constituting character number judgement part for judging whether or not the number of characters of the extracted word is greater than a prescribed number; a vowel judgement part for judging, when the numbers of characters constituting the extracted word is judged to be greater than a prescribed number in the word-constituting character number judgement part, whether or not each of those characters constituting the extracted word is a vowel, and removing, if so, a character judged to be a vowel from a comparison object; a word comparison part for comparing constituent characters constituting the extracted word after passing through the vowel judgement part with those characters constituting each word in a word table selected in the word table selecting part for evaluating the number of coincident characters; a candidate word retrieving part for selecting a candidate word having the largest number of coincident characters evaluated in the word comparison part; and a post-processing part for outputting the candidate word selected in the candidate word retrieving part.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

In what follows, an embodiment of an optical character reader apparatus according to the present invention will be described with reference to the accompanying drawings.

Figure 1B:
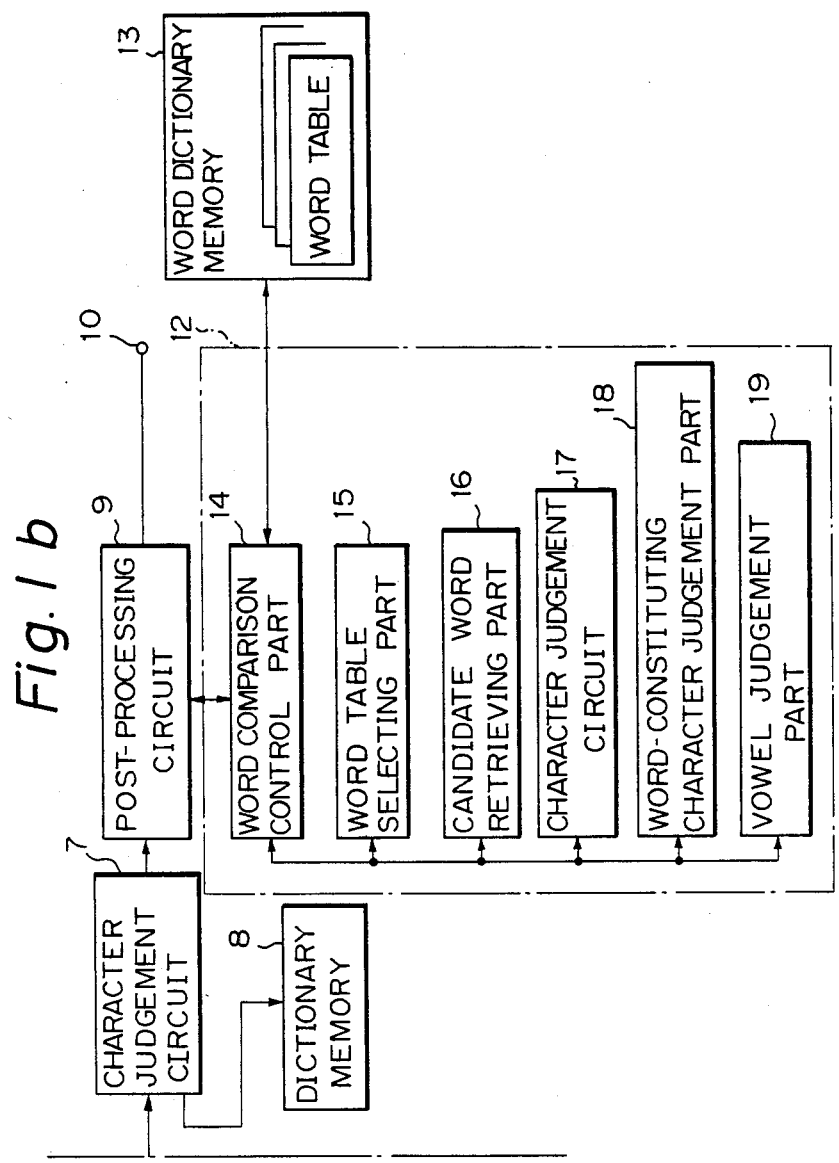
FIG. 1, consisting of FIGS. 1a and 1b, is a block diagram illustrating an embodiment of an OCR apparatus according to the present invention.

FIG. 1 illustrates an OCR apparatus according to the present invention.

As shown in FIG. 1, element 1 is a document card on which characters such as those in an English sentence are written mannually or by printing; element 2 is a conveyor mechanism for conveying the document card 1 in conformity with a predetermined format; element 3 is a focusing lens for focusing light reflected from the document card 1 onto a photoelectric converter sensor 4, said light originating from an illumination lamp 11 (described later); element 4 is the photoelectric converter sensor for converting the light reflected from the document card 1, by a photoelectric conversion, into an electrical signal; element 5 is a pre-processing circuit for converting an electrical signal from the photoelectric converter sensor 4 to binary values to yield a binary picture image signal and for outputting a picture image corresponding to one character therefrom; element 6 is a feature extracting circuit for extracting the feature of a character in conformity with a predetermined procedure; element 7 is a character judgement circuit described later for comparing a dictionary memory 8 having feature data of characters previously registered therein with feature data output from the feature extracting circuit 6 and for delivering a character code of a coincident character as a result of the comparison; element 8 is a dictionary memory for previously registering therein character feature data corresponding to character codes of those characters; element 9 is a post-processing circuit for effecting editing and output control, etc., corresponding to the judgement result in the character judgement circuit 7; element 10 is an output terminal; and element 11 is an illumination lamp.

In succession, the operation of the OCR apparatus shown in FIG. 1 will be described.

First, with the document card 1 being moved by means of the conveyor mechanism 2, and illuminated by the illumination lamp 11, reflected light from the document card 1 is focused onto the photoelectric converter sensor 4 through the focusing lens 3 to yield, as a sensor output, a picture image signal on the document card 1 in a form of electrical signal. The conveyor mechanism 2 is controlled by a control circuit (not shown), and such a picture image signal corresponding to a prescribed region on the document card 1 is written into a line image buffer memory (not shown) in the pre-processing circuit 5.

Then, the pre-processing circuit 5 outputs a picture image corresponding to one character from the resulting line picture image and transmits it to the feature extracting circuit 6. The feature extracting circuit 6 executes the so-called recognition algorithm to extract the contour of character lines and the feature of a background portion in conformity with a predetermined procedure. The character judgement circuit 7 compares the dictionary memory 8 having a dictionary for character recognition previously registered with the resulting feature, and delivers a coincident character code to the post-processing circuit 9. There are three expected types of cases for the output contents from the character judgement circuit 7: a first type in which a plurality of character codes are yielded; a second type in which only one character code is yielded; and a third type in which no character code is yielded. If only one character code is yielded, the character can be said to be recognized satisfactorily; when no character code is yielded, it is suggested that no corresponding character is existent in the document memory 8. In addition, if a plurality of character codes are yielded, it means that they are likely to be frequently produced when the concerning character pattern bears a close resemblance to other character patterns, so as not to permit one character code to be yielded but rather to permit a plurality of character candidates to be yielded.

Successively, the post-processing circuit 9 extracts a word from a character group delivered in succession from the character judgement circuit 7 for effecting comparison in a unit of this word. Moreover, since one of the characters constituting the word has a plurality of character codes as described above, each of the plurality of character codes is processed as corresponding to the above one character.

In the following description, the operation of such a word comparison will be described.

Figure 2B:
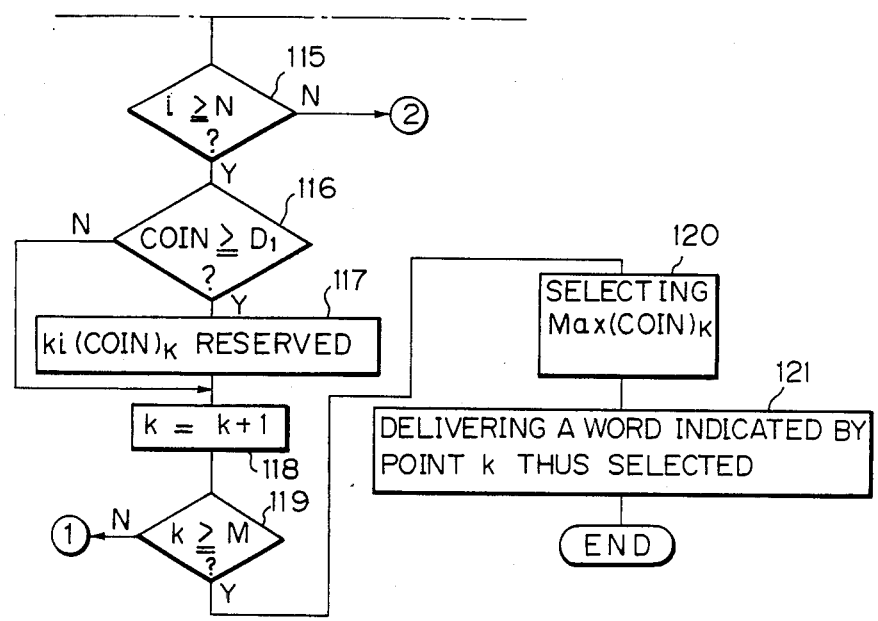
FIG. 2, consisting of FIGS. 2a and 2b, is a flow chart illustrating the operation of a word comparison circuit 12 of FIG. 1.

Referring to FIG. 1, element 12 is a word comparison circuit; element 13 is a word dictionary memory; element 14 is a word comparison control part; element 15 is a word table selecting part; element 16 is a candidate word retrieving part; element 17 is a character judgement circuit; element 18 is a word-constituting character number judgement part, and element 19 is a vowel judgement part. FIG. 2 is a flow chart illustrating operation of the word comparison circuit 12. In addition, FIG. 3a is a view illustrating a format of a memory table in which read results are stored, while FIG. 3b is a view illustrating a format of a word table in the word dictionary memory 13, in which table words such as those in an English sentence are previously stored.

Figure 3A:
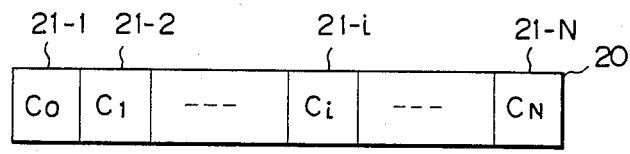
FIG. 3a is a view illustrating a format of a memory table for storing read results therein.

As illustrated in FIG. 3a, element 20 is a memory table for storing therein read results yielded by reading a character group written as a single word in an English sentence, etc., by means of the OCR apparatus in conformity with the above-described procedure, and $21-1$, $21-2, \ldots, 21-i, \ldots, 21-N$ are areas for storing read results of respective characters constituting a word with $C0, C1, \ldots, Ci, \ldots, CN$ respectively indicating the contents of the storage thereof. N indicates the number of characters of a word. Moreover, i is a pointer indicative of the character number in the table 20. Furthermore, as illustrated in FIG. 3b, element 30 is a table, and $31-1, \ldots, 31-k, \ldots, 31-M$ are respectively storage locations of words registered in the table 30. The table 30 is therefore adapted to register M words therein.

Noting now the kth word $31-k$, this word consists of N characters, each character being designated at $W0^k$, $W1^k, \ldots, Wi^k, \ldots, WN^k$. $Wi^k$ here represents the ith constituent character of the kth word registered in the word table.

Figure 3B:
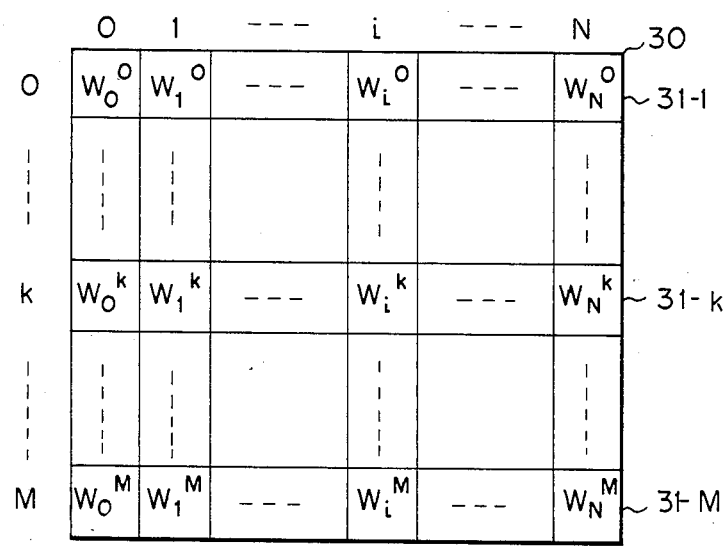
FIG. 3b is a view illustrating a format of a word table, which previously stores words therein, in a word dictionary memory 13.

Although FIG. 3b illustrates only the word table constituted by N characters, many other word tables may instead be expected depending on the numbers of constituent characters because of the various types of constituent characters constituting words being considered, but they are not shown here in the figure for the sake of brevity. Accordingly, the present OCR apparatus is adapted to select a proper word table in response to the number of read characters and in a corresponding manner thereto.

First, the post-processing circuit 9 extracts as a word a character pump disposed between adjacent spaces, and delivers it to the word comparison control part 14 in the word comparison circuit 12. Assuming that this word is constructed of N characters, the word table selecting part 15 selects a word table composed of N characters in the word dictionary memory 13 (step 100). The character judgement part 17 initializes a coincidence number counter "COIN" counted up when the character pointer i, word pointer k, ith character constituting a word in each word, and ith character as a read result are coincident with each other (step 101 and 102). In succession, the candidate word retrieving part 16 takes out the ith character Ci as a read result (step 103). Successively, the word constituting character number judgement part 18 compares the number N of characters constituting a word as a read result with a constant D2 to thereby judge whether or not the former number N is greater than the latter constant D2 (step 104), and the control advances, if N is less than D2, to step 106. In addition, if N is greater than or equal to D2, the vowel judgement part 19 judges whether or not the ith character Ci is a vowel (step 105), and if not, the control advances to step 106. While, if so, the judgement part 19 regards the ith character Ci to be a candidate character and the control advances to step 114 described later.

In succession, step 106 judges the attributes of Ci. Here, the attributes mean the number indicated by S of character codes yielded as a result indicated by S. This value S is, although not shown in the figure, known upon reading and hence is assumed to be stored. If, as a result of step 106, the character code is under $s=0$ (this means no candidate word has been yielded), then the control advances to step 114 descrbed later. And, if it is under $s=1$ (this means only one candidate word has been yielded), Ci and the ith constituent character $Wi^k$ of the kth word in the word table are checked to see if they are coincident with each other (step 107), and if coincident the coincident counter "COIN" is counted up (step 108), and otherwise the control advances to the step 114. Moreover, if $s=0$, and $s=1$, which means a plurality of character codes have been yielded, the candidate word retrieving part 16 searches a plurality of candidates from $l=0$ to s (steps 109, 110, 111, and 112). If there is any coincident code thereamong, the coincident number counter "COIN" is counted up (step 113), and if otherwise the control advances to step 114. In the step 114, the character number counter i is counted up, and if this counter i is less than N characters, the control returns to the step 103 to judge the next character with the same operation (step 115). Thus, all the characters involved in the word are judged.

In succession, the contents of the coincident number counter "COIN" are examined and compared with the constant D1 (step 116), and if the former is less than the latter, the control advances to step 118, and if otherwise, the contents of the "COIN" and k are reserved (step 117). Those operations in the steps 116 and 117 are based on the principle that less coincident words are eliminated at that time. The reserved value of k is the number of a coincident words, and this word is registered as one of candidate words. In addition, a plurality of areas are available for the above reservation, which are adapted to register thereon all words having coincident numbers more than the constant D1, and whose value may be 10 at most. Moreover, D1, although assumed to be a constant, may be made dynamically variable as a function of the word-constituting character number N. Furthermore, a judgement is made as to whether or not the operations effected until now are executed for all words involved in the word table (steps 118, 119) and if not, the control returns to the step 102, and if otherwise, advances to step 120.

In succession, in the steps 120 and 121, a comparison check in a word unit between the word table and the read result is finished, and word numbers of words, in the word table having a coincident number more than D1 as well as the number of coincidences are preserved. Accordingly, the number of a word having the maximum, coincident number is selected from among the preserved candidate word group (step 120), and a word name corresponding thereto is transmitted via the post-processing circuit 9.

When the number of a word having the maximum number of coincidences is not uniquely determined, the word comparison is deemed unsatisfactory, and the result may be processed as follows: the read result is delivered as is; a plurality of words having greater numbers of coincidences are delivered; or both of them are delivered. In any case, the selection may be left to an operator. Otherwise, comparison for all constituent characters of a word read again including vowels may be conducted.

Although the coincident number counter "COIN" was counted up commonly for words, it is effective to count up the counter by weighting it with values to be added thereto depending on the attribute s. For example, +3 is employed to weight the character code =1 therewith yielded in step 106, or +1 is employed to weight if plurality of character codes are yielded in step 106. In addition, if no character code is yielded in the step 106, −1 may be applied as a penalty.

In the following, exemplary circuits of the post-processing circuit 9, word comparison circuit 12, and word dictionary memory 13 to concretely execute the operation described above will be explained with reference to FIGS. 4 and 5.

Figure 4:
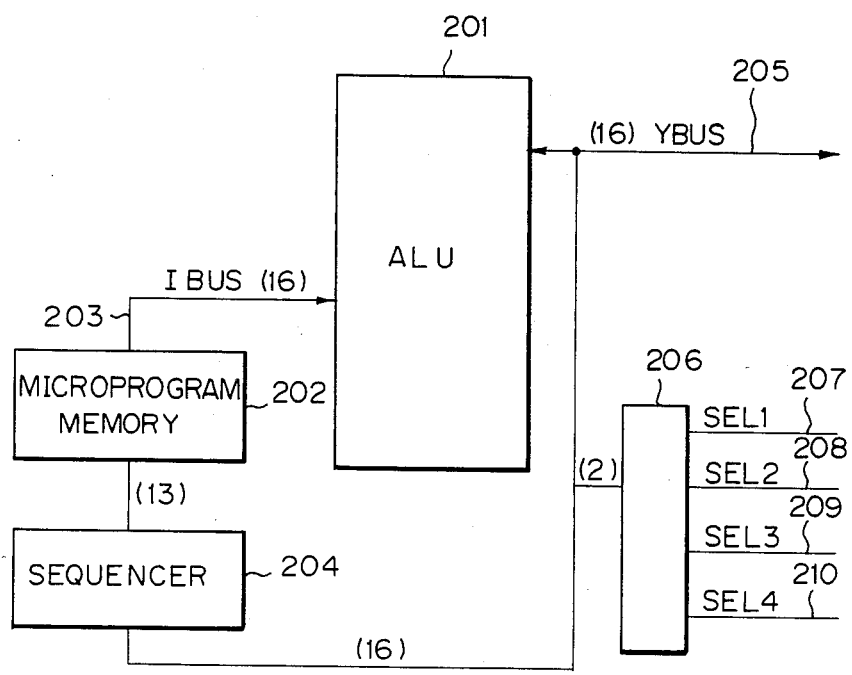
FIG. 4 is a block diagram illustrating a microprocessor circuit for executing functions and controls of a post-processing circuit 9 and a word comparison circuit 12.

First, referring to FIG. 4, illustrating a microprocessor circuit to execute functions and controls of the post-processing circuit 9 and the word comparison circuit 12, element 201 is an arithmetic logic unit (hereinafter referred to as ALU) which may include Advanced Micro Devices Inc., part No. AM 29116; element 202 is a microprogram memory, and a microprogram stored therein is employed to operate the microprocessor circuit and an I/O circuit described later; element 203 is an I bus composed of sixteen signal lines for interconnecting the above ALU 201 and the microprogram memory 202. The ALU 201 executes an arithmetic operation in conformity with an instruction inputted from the IBUS 203. Likewise element 204 is a sequencer for providing addresses of the microprogram memory 202, and which consists of four elements of an AM 2911 for example. In addition, the ALU 201 is connected to the I/O circuit described later through a YBUS 205 for data delivery. Element 206 is a decoder for generating SEL1 signal 207 to SEL 4 signal 210 from two signals on the YBUS 205.

Here, a numerical value in ( ) indicates the number of signal lines.

Figure 5:
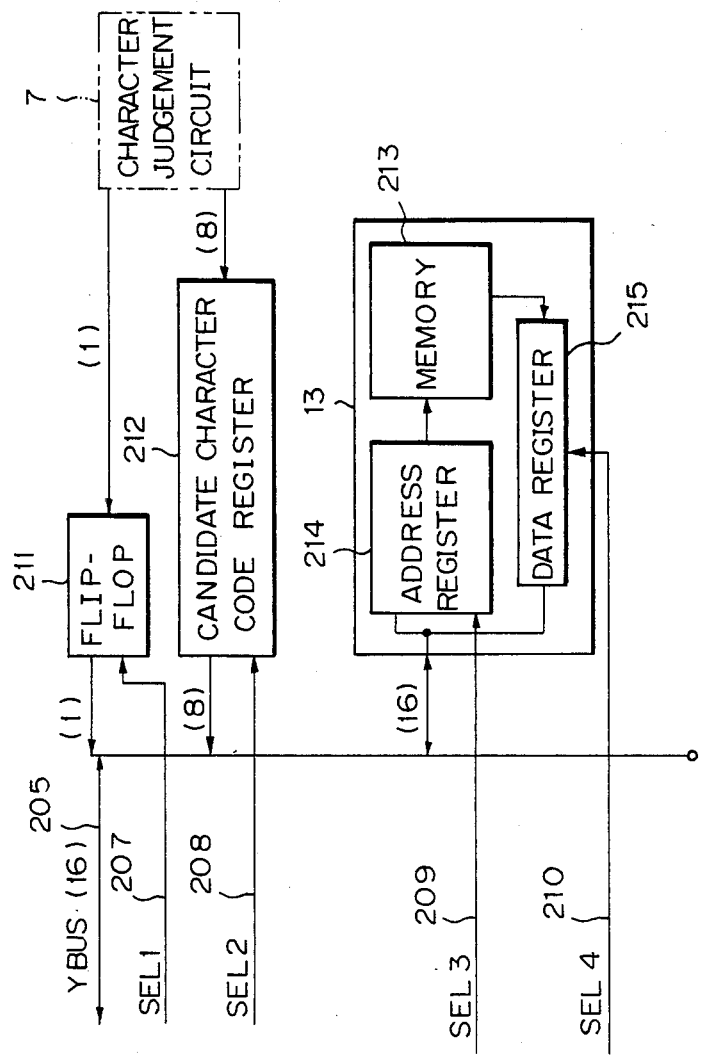
FIG. 5 is a block diagram illustrating an I/O circuit connected to the microprocessor circuit of FIG. 4.

FIG. 5 illustrates the I/O circuit connected to the Y bus 205 of the microprocessor circuit.

Element 211 is a flip-flop for storing therein a start signal from the character judgement circuit 7, the start signal being delivered to the Y bus 205 using the SEL 1 signal 207, and element 212 is a register for storing a candidate character code issued from the character judgement circuit 7, data in this register 212 being delivered to the YBOS 205 using the SEL2 signal 208. Moreover, in the word dictionary memory 13, element 213 is a memory for storing words; element 214 is an address register for assigning addresses of the memory 213, and element 215 is a data register for storing therein data from the memory 213. The address register 214 incorporates data from the Y bus 205 using the SEL3 signal 209, while the data register 215 delivers data to the Y bus 205 using the SEL 4 signal 210.

Although a certain preferred embodiment has been shown and described, it should be understood that many changes and modifications may be made therein without departing from the scope of the appended claims.

What is claimed is:

1. An optical character reader apparatus comprising:
   (a) an optical system for converting characters written on a document card to an optical signal and for converting said optical signal to an electrical signal;
   (b) a pre-processing circuit connected to said optical system for converting said electrical signal into a binary picture image signal, and for extracting a picture image corresponding to one character from said binary picture image signal;
   (c) a feature extracting circuit connected to said pre-processing circuit for extracting features of said one character in conformity with a predetermined procedure;
   (d) a character judgement circuit connected to said feature extracting circuit for effecting a comparison of said one character;
   (e) a dictionary memory connected to said character judgement circuit for previously registering feature data of characters corresponding to character codes of said characters, and for further enabling said character judgement circuit to compare said feature data from said feature extracting circuit with said feature data registered in said dictionary memory and for delivering character codes of coincident characters in response to said comparison;
   (f) a post-processing circuit connected to said character judgement circuit and an output terminal for effecting editing and output control corresponding to said judgement in said character judgement circuit;
   (g) a vowel judgement part connected to said word comparison control part for judging whether or not respective constituent characters of the extracted words are vowels when said number of characters constituting the word extracted in said word constituting character number judgement part is greater than a prescribed number, and if so, eliminating a constituent character judged to be a vowel from among said constituent characters being compared; and
   (h) a word comparison circuit connected to said post-processing circuit for effecting word comparison in cooperation with said circuit.

2. An optical character reader apparatus according to claim 1, wherein said optical system includes:
   (a) a document card conveyor mechanism for conveying a document card in conformity with a predetermined format;
   (b) an illumination lamp for illuminating the document card;
   (c) a focusing lens for focusing reflected light from the document card; and
   (d) a photoelectric conversion sensor for converting light reflected from the document card to provide an electrical signal.

3. An optical character reader apparatus according to claim 1, wherein said word comparison circuit includes:
   (a) a word dictionary memory for previously registering words in word tables therein while classifying said words for every number of characters constituting said word;
   (b) a word comparison control part connected to said post-processing circuit and said word dictionary memory for controlling the word comparison;
   (c) a word table selecting part connected to said word comparison control part for selecting at least one of said word tables in said word dictionary memory in response to the number of characters constituting an extracted word;
   (d) a word-constituting character judgement part connected to said word comparison control part for judging whether or not the number of characters constituting the extracted word is greater than a prescribed number;
   (e) a word comparison part connected to said word comparison control part for comparing the constituent characters of the extracted word yielded through said vowel judgement part with constituent characters of each word in said word table selected in said word table selecting part and for thereby evaluating the number of coincident characters; and (f) a candidate word retrieving part connected to said word comparison control part for selecting as a candidate word, a compared word having the largest number of the coincident characters in said word comparison part.

4. An optical character reader apparatus according to claims 1, wherein the functions and controls of said post-processing circuit and said word comparison circuit are executed by a microprocessor circuit.

5. An optical character reader apparatus according to claim 3, wherein the functions and controls of said post-processing circuit and said word comparison circuit are executed by a microprocessor circuit.

6. An optical character reader according to claim 4, wherein said microprocessor includes: an arithmetic logic unit for effecting arithmetic operation; a microprogram memory for operating said microprocessor circuit in conformity with a microprogram stored therein; an I bus composed of 16 signal lines for mutual connection of said arithmetic logic unit and said microprogram memory; a sequencer connected to said microprogram memory for providing addresses of said microprogram memory; a Y bus connected to said arithmetic logic unit for use in data delivery; an I/O circuit connected to said Y bus; and a decoder connected to said Y bus and said sequencer for generating a selection signal from two signals on the Y bus.

7. An optical character reader according to claim 5, wherein said microprocessor includes: an arithmetic logic unit for effecting arithmetic operation; a microprogram memory for operating said microprocessor circuit in conformity with a microprogram stored therein; an I bus composed of 16 signal lines for mutual connection of said arithmetic logic unit and said microprogram memory; a sequencer connected to said microprogram memory for providing addresses of said microprogram memory; a Y bus connected to said arithmetic logic unit for use in data delivery; an I/O circuit connected to said Y bus; and a decoder connected to said Y bus and said sequencer for generating a selection signal from two signals on the Y bus.

8. An optical character reader apparatus according to claim 4, wherein said microprocessor includes: an arithmetic logic unit for effecting arithmetic operation; a microprogram memory for operating said microprocessor circuit in conformity with a microprogram stored therein; an I bus composed of 16 signal lines for mutual connection of said arithmetic logic unit and said microprogram memory; a sequencer connected to said microprogram memory for providing addresses of said microprogram memory; a Y bus connected to said arithmetic logic unit for use in data delivery; an I/O circuit connected to said Y bus; and a decoder connected to said Y bus and said sequencer for generating a selection signal from two signals on the Y bus.

9. An optical character reader apparatus according to claim 1, wherein said I/O circuit includes: a flip-flop connected to said character judgement circuit for storing a start signal from said character judgement circuit and transmitting it to said Y bus by the SEL 1 signal; a candidate character code register connected to said character judgement circuit and the Y bus for storing a candidate character code delivered from said character judgement circuit and transmitting it to the Y bus by the SEL 2 signal; and, in said word dictionary memory, a memory for storing words, an address register for assigning any address of the memory, and a data register for storing data from said memory, said address register incorporating therein data from said Y bus based upon the SEL 3 signal while said data register delivering the concerning data to the Y bus based upon the SEL 4 signal.

* * * * *